United States Patent
Ohta et al.

[11] Patent Number: 6,157,103
[45] Date of Patent: Dec. 5, 2000

[54] STEP MOTOR

[75] Inventors: Hirohisa Ohta; Tetsuji Kondo; Takeshi Sugiyama; Chiaki Sugano, all of Tokyo, Japan

[73] Assignee: Mitsubishi Denki Kabushiki Kaisha, Tokyo, Japan

[21] Appl. No.: 09/158,896

[22] Filed: Sep. 23, 1998

[30] Foreign Application Priority Data

Feb. 27, 1998 [JP] Japan .................................. 10-047877

[51] Int. Cl.[7] .......................... H02K 37/14; H02K 37/24; H02K 7/06
[52] U.S. Cl. ........................................ 310/49 R; 310/80
[58] Field of Search ................................. 310/43, 49 R, 310/80, 89, 164; 251/129.11

[56] References Cited

U.S. PATENT DOCUMENTS

| | | | |
|---|---|---|---|
| 3,694,909 | 10/1972 | Hallerback | 310/43 |
| 4,393,319 | 7/1983 | Bock | 310/80 |
| 5,052,656 | 10/1991 | Katayama | 251/129.11 |
| 5,060,910 | 10/1991 | Iwata et al. | 251/129.11 |
| 5,137,255 | 8/1992 | Sumida et al. | 251/129.11 |
| 5,138,208 | 8/1992 | Kondo et al. | 310/64 |
| 5,501,201 | 3/1996 | Miyoshi et al. | 251/129.11 |
| 5,912,520 | 6/1999 | Kobayashi et al. | 310/80 |

FOREIGN PATENT DOCUMENTS

3-275979  12/1991  Japan .

*Primary Examiner*—Clayton LaBalle
*Attorney, Agent, or Firm*—Sughrue, Mion, Zinn, Macpeak & Seas, PLLC

[57] ABSTRACT

A step motor is provided that makes it possible to lower the manufacturing cost and accurately control the movement of a holder. The step motor is provided with: a motor case (3); a hollow columnar stator (4) which is provided inside the motor case (3) and which generates a magnetic field; a rotor (42) which is rotatably provided in the stator (4) and which rotates in steps according to the generated magnetic field of the stator (4); an actuating shaft (43) which is fixed to the rotor (42) and which has a threaded portion (53) at one end thereof; a holder (45) which is threadably engaged with the threaded portion (53) and which is movable in the axial direction; and a guide (44) which is fixed to the motor case (3), which prevents the rotational motion of the holder (45), and which guides the holder (45) to move in the axial direction.

12 Claims, 5 Drawing Sheets

PRIOR ART

STEP MOTOR

BACKGROUND OF THE INVENTION

1. Field of the Invention

The present invention relates to a step motor having a rotor which is rotatably provided in a stator and which rotates in steps according to the generated magnetic field of the stator.

2. Description of Related Art

Figure 10:
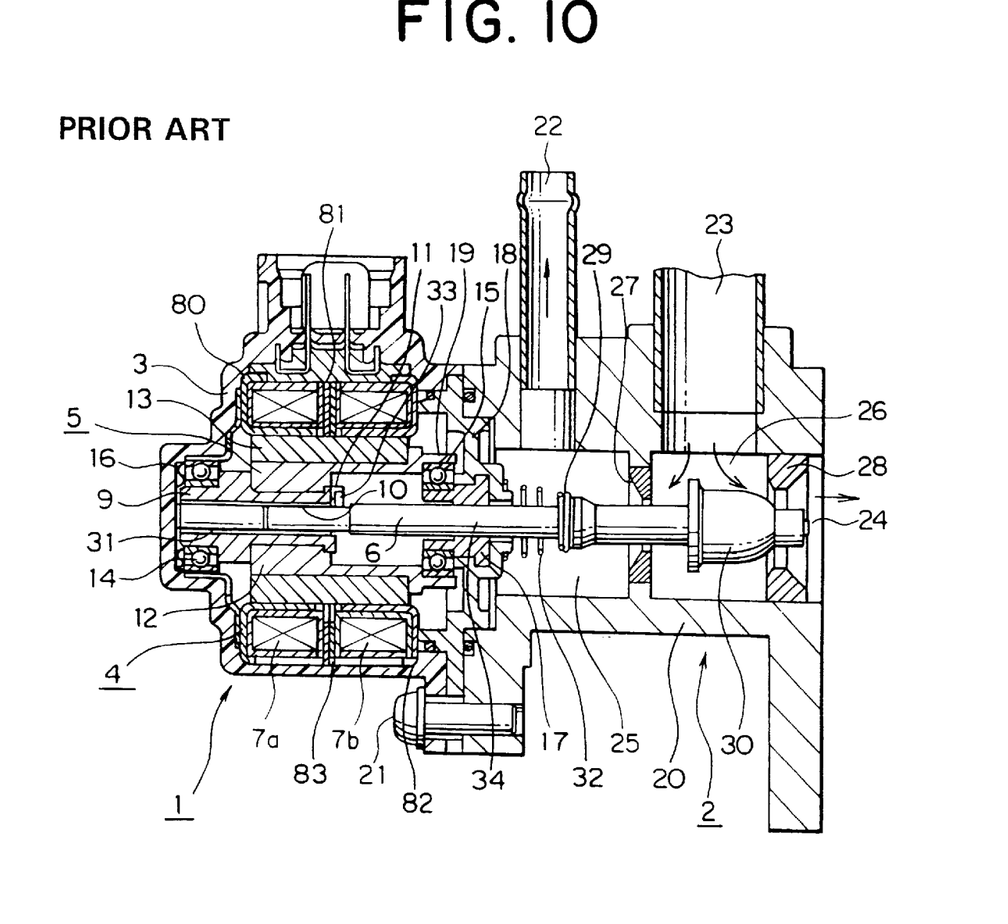
FIG. 10 is a sectional view of a conventional flow control valve.

FIG. 10 is a sectional view showing a conventional flow control valve disclosed in Japanese Patent Application Laid-Open No. 3-275979. The flow control valve has a step motor 1 serving as an actuator and a valve device 2 which controls the rate of flow of air according to the operation of the step motor 1.

The step motor 1 is equipped with: a motor case 3; a hollow columnar stator 4 provided inside the motor case 3; a rotor 5 rotatably provided in the hollow portion of the stator 4; and an actuating shaft assembly 6 which is located at the center of the rotor 5 and which reciprocates in the axial direction as the rotor 5 rotates.

The stator 4 is equipped with: a first coil 7a and a second coil 7b consisting of spirally wound conductors; first and second stator assemblies 80 and 81 which partially cover the first coil 7a; and third and fourth stator assemblies 82 and 83 which partially cover the second coil 7b.

The rotor 5 is provided with: an internal thread portion 10 formed on the inner peripheral surface thereof; a support member 9 having a spiral stopper 11 formed on an end thereof; a sleeve 12 fixed on the outer side of the support member 9; and a magnet assembly 13 arranged around the sleeve 12, the magnet assembly consisting of north-pole magnet segments and south-pole magnet segments which are alternately disposed.

The rotor 5 is rotatably supported by a first ball bearing 14 and a second ball bearing 15. The first ball bearing 14 is secured by the inner ring thereof being pressed into contact with the support member 9, while the outer ring thereof being pressed into contact with the motor case 3. The outer ring of the first ball bearing 14 is pressed against the second ball bearing 15 through a corrugated washer 16 so as to prevent the rotor 5 from moving in the axial direction. The second ball bearing 15 is secured by the inner ring thereof being pressed into contact with the a slide bearing 17 incorporated in a plate 18, while the outer ring thereof being pressed into contact with an end 19 of the sleeve 12.

The actuating shaft assembly 6 is provided with: an external thread portion 31 having a round section; a shaft 34 which has an elliptical section so as to prevent rotation; and a pin 33 which is mounted on an end of the external thread portion 31 so that it extends radially and abuts against the stopper 11 to prevent the actuating shaft assembly 6 from rotating.

The motor case 3 is secured to a housing 20, which constitutes a passage for the bypass air of an engine induction system, by a fixing screw 21 via a plate 18. The housing 20 has first to third ports 22, 23, and 24, and a two-system first bypass passage 25 and second bypass passage 26 formed therein.

The valve device 2 is equipped with: a first valve seat 27 and a second valve seat 28 which are concentric with the actuating shaft assembly 6; a first valve 29 and a second valve 30 which are secured to the actuating shaft assembly 6 and which are opposed to the first valve seat 27 and the second valve seat 28; and a spring 32 which is provided between the plate 18 and the first valve 29 and which urges the first valve 29 toward the first valve seat 27.

The operation of the flow control valve having the configuration described above will now be described.

When the first coil 7a and the second coil 7b receive an electrical signal from a control unit, not shown, the rotor 5 rotates in the forward or reverse direction according to the received electrical signal. Since the external thread portion 31 of the actuating shaft assembly 6 is screwed onto the internal thread portion 10 of the support member 9, when the rotor 5 rotates the actuating shaft assembly 6 is subjected to the elastic force of the spring 32 and reciprocates. For instance, when the actuating shaft assembly 6 moves to the right in FIG. 10, the first and second valves 29 and 30 respectively approach the first and second valve seats 27 and 28, causing the passage areas of the bypass air flowing through the bypass passages 25 and 26 to gradually decrease. When the feed amount of the actuating shaft assembly 6 reaches a maximum value, the first and second valves 29 and 30 come in contact with the first and second valve seats 27 and 28 respectively to close off the first and second bypass passages 25 and 26.

The valve closing end of the stroke of the actuating shaft assembly 6 is determined by the position where the first valve 29 comes in contact with the first valve seat 27. Moreover, the valve opening end is determined by the position where the stopper 11 on the spiral-shaped end surface at the end of the support member 9 comes in contact with the pin 33 mounted on the external thread portion 31.

In the step motor 1 having the configuration described above, the directions in which the first coil 7a and the second coil 7b are energized can be changed; a total of four energizing patterns are available. The polarity, i.e. the north pole and the south pole, of a first stator 80, a second stator 81, a third stator 82, and a fourth stator 83 is decided according to the pattern selected. With a magnetic field having these polarities, the rotor 5 rotates a predetermined angle until the magnetic forces interacting between the stators and the magnet assembly 13 are balanced, and this position is maintained.

If the energizing pattern of the first coil 7a and the second coil 7b is changed to a first energizing pattern, a second energizing pattern, a third energizing pattern, a fourth energizing pattern, the first energizing pattern, the second energizing pattern, and so on in this order, then the rotor 5 rotates in the same direction a predetermined angle and the actuating shaft assembly 6 accordingly moves a predetermined distance in the axial direction.

In order to drive the step motor 1 in exact accordance with the instructions received from the control unit, it is necessary to initialize the actuating shaft assembly 6 in advance. More specifically, the initial home position of the actuating shaft assembly 6 must be defined by moving the actuating shaft assembly 6 to the position where the stopper 11 of the support member 9 comes in contact with the pin 33.

To permit accurate initialization, a number of steps greater than the number of steps at which the actuating shaft 6 reaches the motor end is provided in the step motor 1. Thus, even when the energized first coil 7a and second coil 7b are energized to rotate the rotor 5 after the actuating shaft assembly 6 reaches the motor end position, the rotor 5 does not rotate because the stopper 11 is in contact with the pin 33, thereby preventing the actuating shaft assembly 6 from moving any further in the valve opening direction.

In the conventional flow control valve, the rotational motion of the rotor 5 is directly converted to the linear motion of the actuating shaft assembly 6. The slide bearing 17, which is slidable with respect to the elliptical shaft 34, is provided as a converting member for converting the motion of the actuating shaft assembly 6 into the axial motion. The slide bearing 17 poses a problem because the shape thereof is complicated as it has to be engaged with the plate 18 and the second ball bearing 15, thus adding to the manufacturing cost thereof.

Further, in the conventional flow control valve, the costly first ball bearing 14 must rotatably support the rotor 5, and the corrugated washer 16 must prevent the rotor 5 from moving in the axial direction in the motor case 3; these two components cannot be omitted, thus increasing cost.

Further, in the conventional flow control valve, a number of steps which is greater than the number of steps at which the actuating shaft 6 reaches the motor end is provided in the step motor 1 in order to accurately initialize the actuating shaft assembly 6, the magnetizing position of the magnet assembly 13 in relation to the circumferential position of the stopper 11 can not be determined; therefore, the magnetizing position of the magnet assembly 13 when the stopper 11 comes in contact with the pin 33 is not consistent. In other words, which of the four patterns will be adopted for energizing the first coil 7a and the second coil 7b when the actuating shaft assembly 6 is in the initial position is unknown. Accordingly, if reverse current is supplied to the first coil 7a and the second coil 7b to move the actuating shaft assembly 6 toward the valve seats 27 and 28, the pin 33 will come in contact with the stopper 11 in a plurality of steps until the energizing pattern which actually moves the actuating shaft assembly 6 is applied. This means that the relationship between the number of steps and the amount the actuating shaft assembly 6 is moved varies, posing still another problem in that an amount of flow that is supposedly controlled inevitably varies.

It is conceivable to provide a means for detecting the signal pattern for energizing the first coil 7a and the second coil 7b that indicates the magnetizing position of the magnet assembly 13 at the moment the stopper 11 touches the pin 33. Adding this means, however, would also increase the pose the cost.

SUMMARY OF THE INVENTION

The present invention has been made with a view toward solving the problems mentioned above, and it is an object of the present invention to provide a step motor which permits a reduced manufacturing cost and accurate control of the movement of a holder thereof.

According to one aspect of the present invention, there is provided a step motor equipped with: a motor case; a hollow columnar stator which is provided inside the motor case and which generates a magnetic field; a rotor which is rotatably provided in the stator and which rotates in steps according to the magnetic field generated by the stator; an actuating shaft fixed to the rotor and which has a threaded portion at one end thereof; a holder which is threadably engaged with the threaded portion and which is movable in the axial direction; and a guide which is fixed to the motor case, which prevents the rotational motion of the holder, and which guides the holder to move in the axial direction.

In a preferred form, the rotor of the step motor is rotatably supported by a support member at a shaft protruding from one end of the rotor and a bearing provided at the other end of the rotor.

In another preferred form, the bearing of the step motor is urged toward the support member by a spring.

In yet another preferred form, the support member of the step motor is discoid with a through hole through which a shaft passes and covers one side surface of the stator to prevent the entry of a resin into the stator when it is formed into an insert-mold together with the stator.

According to another aspect of the present invention, there is provided a step motor equipped with: a motor case; a hollow columnar stator which is provided inside the motor case and which generates a magnetic field; a rotor which is rotatably provided in the stator, which rotates in steps according to the magnetic field generated by the stator, and which has a magnet assembly wherein south-pole and north-pole segments are disposed alternately, and wherein a positioning section is formed to place the magnet assembly in a predetermined position in a metal mold, and which has a sleeve made integral with the magnet assembly; an actuating shaft which is fixed to the rotor and which has a threaded portion formed on one end thereof; a holder which is threadably engaged with the threaded portion and which is movable in the axial direction; and a guide which is fixed to the motor case, which prevents the rotational motion of the holder, and which guides the holder to move in the axial direction; wherein the sleeve is formed such that a fixed positional relationship is established between the positioning section and the impact portion of the sleeve in the metal mold so that a fixed positional relationship is established between the initial position of the holder, where the end of the holder comes in contact with the impact portion to stop the rotation of the rotor, and the magnetizing position of the magnet assembly.

In a preferred form, the step motor according to the present invention is made integral with a valve device which controls the flow of a fluid so as to control the flow of the fluid according to the reciprocating motion of the holder.

In a further preferred form, a valve for closing off the passages is provided integrally on an end of the holder.

DESCRIPTION OF THE PREFERRED EMBODIMENTS

First Embodiment

Figure 1:
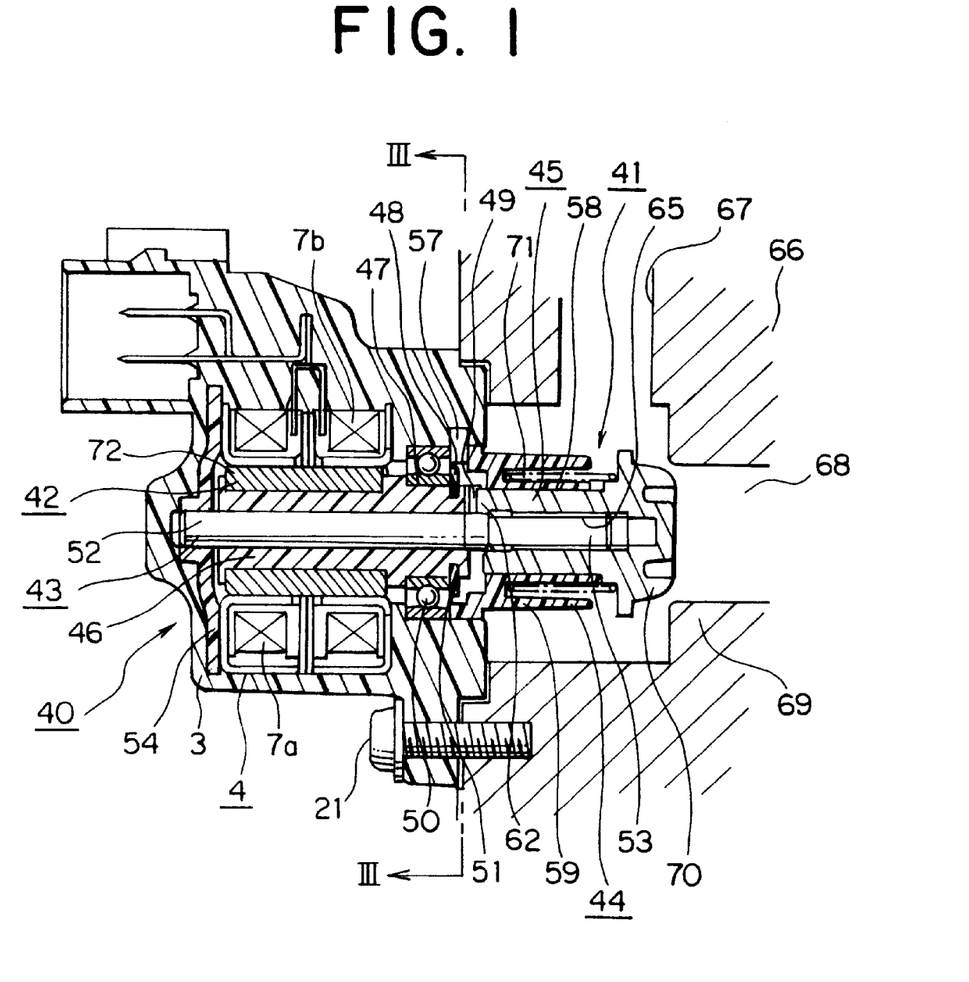
FIG. 1 is a sectional view showing a flow control valve incorporating a step motor of a first embodiment in accordance with the present invention.
Figure 2:
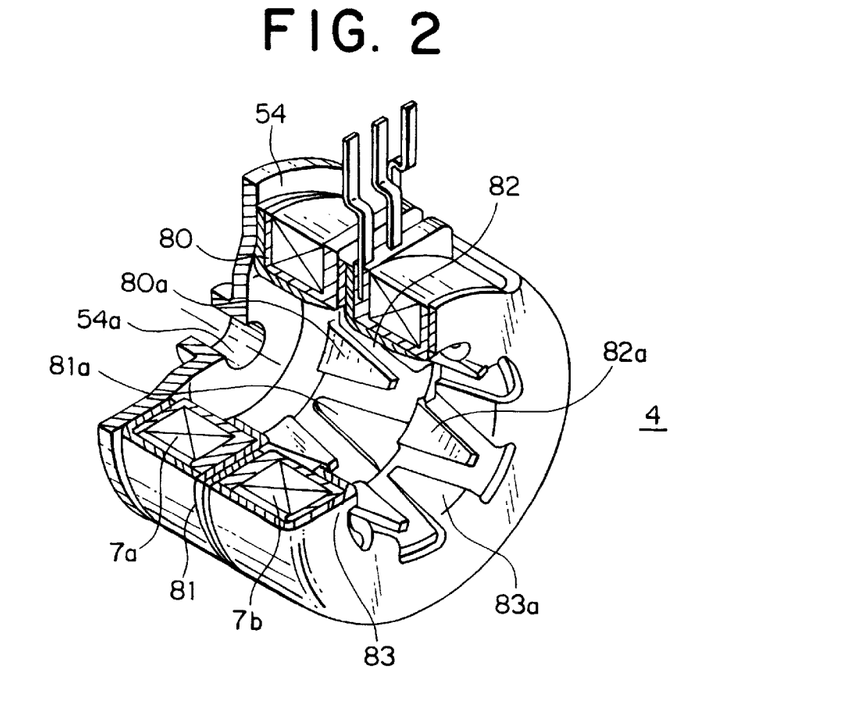
FIG. 2 is a partial sectional perspective view of the step motor shown in FIG. 1.
Figure 3:
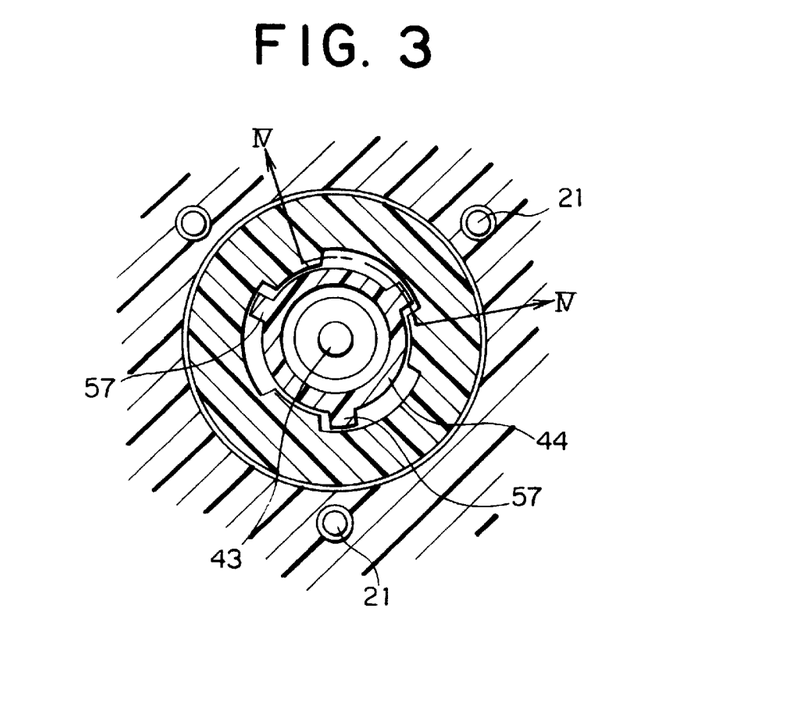
FIG. 3 is a sectional view taken along lines III—III of FIG. 1.
Figure 4:
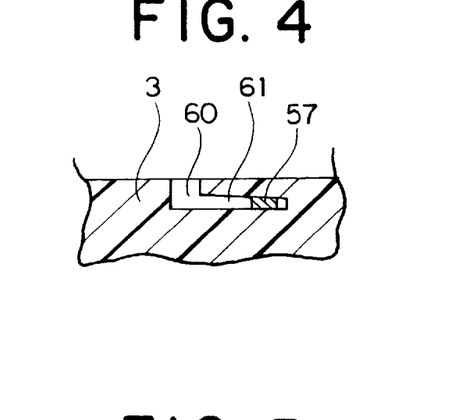
FIG. 4 is a sectional view taken along lines IV—IV of FIG. 3.
Figure 5:
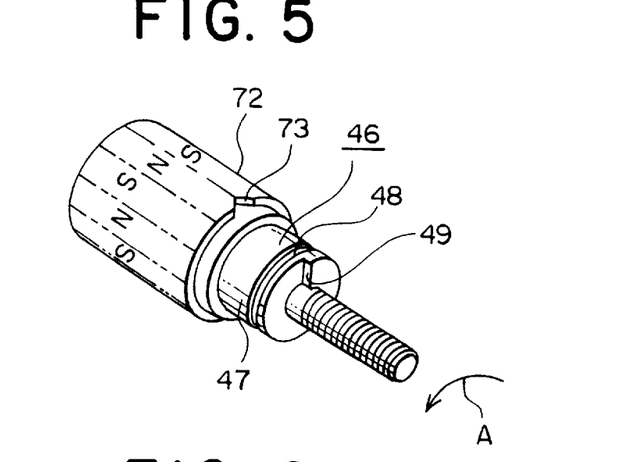
FIG. 5 is a perspective view of a rotor shown in FIG. 1.
Figure 6:
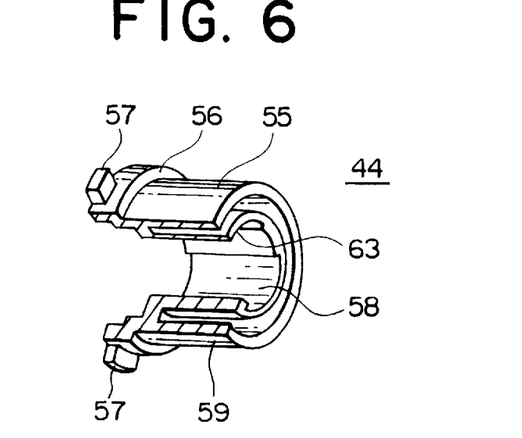
FIG. 6 is a partial sectional perspective view of a guide shown in FIG. 1.
Figure 7:
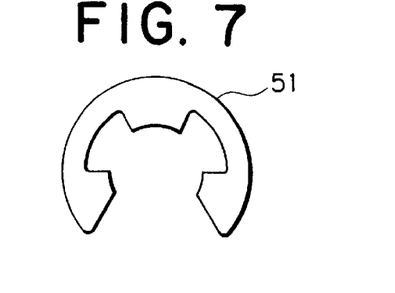
FIG. 7 is a front view of a leaf spring shown in FIG. 1.
Figure 8:
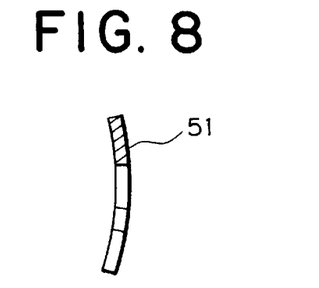
FIG. 8 is a side sectional view of the leaf spring shown in FIG. 7.

FIG. 1 is a sectional view showing a flow control valve incorporating a step motor of a first embodiment of the present invention; FIG. 2 is a partial sectional perspective view of the step motor shown in FIG. 1; FIG. 3 is a sectional view taken along lines III—III of FIG. 1; FIG. 4 is a sectional view taken along lines IV—IV of FIG. 3; FIG. 5 is a perspective view of a rotor shown in FIG. 1; FIG. 6 is a partial sectional perspective view of a guide shown in FIG. 1; FIG. 7 is a front view of a leaf spring shown in FIG. 1; and FIG. 8 is a side sectional view of the leaf spring shown in FIG. 7.

The flow control valve is equipped with a step motor 40 and a valve device 41 which controls the air flow rate according to the operation of the step motor 40.

The step motor 40 is equipped with: a motor case 3; a hollow columnar stator 4 provided inside the motor case 3; a rotor 42 rotatably provided in the hollow portion of the stator 4; an actuating shaft assembly 43 which is provided at the center of the rotor 42 and which rotates as the rotor 42 rotates; a cylindrical guide 44 joined to the motor case 3; and a holder 45 which is provided in the guide 44 and which is slidable in the axial direction.

The stator 4 is provided with: a first coil 7a and a second coil 7b consisting of spirally wound conductors; a first stator 80 and a second stator 81 which partially cover the first coil 7a; and a third stator 82 and a fourth stator 83 which partially cover the second coil 7b. As shown in FIG. 2, a claw 80a of the first stator 80 and a claw 81a of the second stator 81 are meshed with each other; and a claw 82a of the third stator 82 and a claw 83a of the fourth stator 83 are meshed with each other.

The rotor 42 is provided with: a cylindrical sleeve 46 through which the actuating shaft assembly 43 is passed and fixed thereto; and an annular magnet assembly 72 which is secured around the sleeve 46, which has north pole magnet segments and south pole magnet segments alternately disposed, and which has a notch 73 serving as a positioning means. The notch 73 is used to establish a predetermined relationship between the magnetizing position of the magnet assembly 72 and the position of an impact portion 49 of the sleeve 46 as follows: more specifically, when forming the sleeve 46 by injection-molding polyphenylene sulfide resin into a metal mold, with the magnet assembly 72 and the actuating shaft assembly 43 placed in the mold, the magnet assembly 72 is set in a predetermined position with the stopper of the mold held against the notch 73 so as to obtain the rotor 42 which always provides a fixed relationship between the magnetizing position of the magnet assembly 72 and the position of the impact portion 49 of the sleeve 46.

A stepped portion 47 is formed at an end of the sleeve 46; the stepped portion 47 has a groove 48 which extends circumferentially. An end of the stepped portion 47 is spiral shaped and the impact portion 49 is formed on an end surface thereof to prevent the rotor 42 from rotating in the direction of arrow A. A ball bearing 50 which rotatably supports the rotor 42 is fitted between the stepped portion 47 and the motor case 3. A c-clip like leaf spring 51 which urges the ball bearing 50 toward the magnet assembly 72 is installed in the groove 48. The leaf spring 51 is composed of a spring steel plate; it has a partially annular shape and it is normally flexed to one side as illustrated in FIG. 8.

The actuating shaft assembly 43 is constituted by a shaft 52 secured to the sleeve 46 and a threaded portion 53 made integral with the shaft 52. An end of the shaft 52 is rotatably supported by a support member 54 which is made of polyphenylene sulfide resin and which has a discoid through hole 54a.

Figure 9:
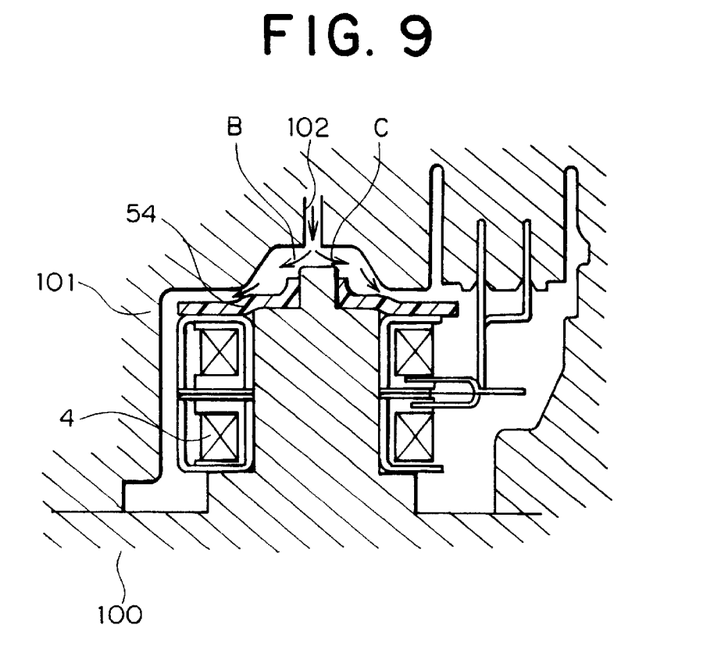
FIG. 9 is a diagram showing a stator of FIG. 1 placed in a metal mold.

FIG. 9 shows a state wherein the stator 4 and the support member 54 are disposed in a first mold 100 and a second mold 101. One side surface of the stator 4 is held against the inside of the first mold 100, and the support member 54 rests on the other side surface of the stator 4. The support member 54 covers the entire surface of the other side surface of the stator so as to prevent the polyphenylene sulfide resin from flowing inside the stator 4 when it enters the molds 100 and 101 through a gate 102. The support member 54 also provides the passages for the resin to flow in the directions of arrow B and arrow C.

The guide 44 is equipped with a double-cylindrical guide main unit 55, a flange 56 formed on an end of the guide main body 55, and three arc-shaped protuberances 57 which are formed at intervals of 120 degrees in the circumferential direction of the flange 56. The guide main unit 55 is composed of an inner cylindrical section 58 and an outer cylindrical section 59. Insertion portions 60 in which the protuberances 57 are inserted, and tapered holes 61 which extend circumferentially from the insertion portions 60 are formed at an end of the motor case 3. The protuberances 57 are inserted at the insertion portions 60, and then the guide 44 is turned in the circumferential direction to fit the tapered protuberances 57 in the holes 61 in the turning direction. This fitting sets the motor case 3 and the guide 44 for preliminary installation; after words, the portion where the motor case 3 and the guide 44 are in contact is thermally fused so as to join the motor case 3 and the guide 44.

The holder 45 has: an impacted section 62 which hits the impact portion 49 formed on the end surface of the sleeve 46 to prevent the rotation of the rotor 42; a guiding protuberance (not shown) which is fitted in a guiding groove 63 formed in the inner wall surface of the inner cylindrical section 58 extending in the axial direction in order to allow the inner cylindrical section 58 to move only in the axial direction; and an internal thread portion 65 which is formed on the inner peripheral surface thereof and which is threadably engaged with the threaded portion 53 of the actuating shaft assembly 43.

The motor case 3 is secured with the fixing screw 21 to a housing 66 in which a first intake passage 67 and a second intake passage 68 are formed.

The valve device 41 is equipped with: a valve seat 69 concentric with the actuating shaft assembly 43; a valve 70 which is opposed to the valve seat 69 and which is made integral with the holder 45; and a spring 71 which is provided between the guide 44 and the valve 70 and which urges the valve 70 toward the valve seat 69.

The operation of the flow control valve having the above configuration will now be described.

When the coils 7a and 7b of the stator 4 receive an electrical signal from a control unit (not shown), the rotor 42 rotates in the forward or reverse direction according to the electrical signal. Since the sleeve 46 is secured to the shaft 52 of the actuating shaft assembly 43, the shaft 52 and the threaded portion 53 made integral with the shaft 52 rotate as the rotor 42 rotates. The threaded portion 53 is threadably engaged with the internal thread portion 65; therefore, as the threaded portion 53 rotates, a torque acts on the guide 44. The rotation of the guide 44 in the circumferential direction is prevented since the guide 44 is integrally joined to the motor case 3. Hence, the threaded portion 53 cooperates with the internal thread portion 65 to act as a "feeding screw," causing the holder 45 to be subjected to the elastic force applied by the spring 71 and reciprocate in the axial direction.

For example, when the holder 45 moves to the right in FIG. 1, the valve 70 made integral with the holder 45 approaches the valve seat 69 to gradually decrease the air passage area. As a result, the amount of air which passes through the first intake passage 67 and the second intake passage 68 and circulates through an internal-combustion engine gradually decreases. When the feed stroke of the holder 45 reaches a maximum value, the valve 70 comes in contact with the valve seat 69 and the first intake passage 67 and the second intake passage 68 are close off by the valve 70.

The position where the valve 70 is open is determined by the position where the impact portion 49 of the sleeve 46 comes in contact with the impacted section 62 at the end of the holder 45.

In the step motor 40 having the configuration described above, the energizing directions of the first coil 7a and the second coil 7b can be changed; a total of four energizing patterns are available. The polarity, i.e. the north pole and the south pole, of the first stator 80, the second stator 81, the third stator 82, and the fourth stator 83 is decided according to the pattern selected. With a magnetic field having these polarities, the rotor 42 rotates a predetermined angle until the magnetic forces interacting between the stators and the magnet assembly 72 are balanced, and this position is maintained.

If the energizing pattern for the first coil 7a and the second coil 7b is changed to the first energizing pattern, the second energizing pattern, the third energizing pattern, the fourth energizing pattern, the first energizing pattern, the second energizing pattern, and so on in this order, then the rotor 42 rotates in the same direction for a predetermined angle and the holder 45 accordingly moves a predetermined distance in the axial direction.

In order to drive the step motor 40 in exact accordance with the instructions received from the control unit, it is necessary to initialize the holder 45 in advance. More specifically, the initial home position of the holder 45 must be defined by moving it to the position where the impact portion 49 of the sleeve 46 comes in contact with the impacted section 62 of the holder 45.

To permit accurate initialization, a number of steps greater than the number of steps at which the holder 45 reaches the motor end is provided in the step motor 40.

In this embodiment, the positional relationship between the notch 73 of the magnet assembly 72 and the impact portion 49 is known beforehand. To be more specific, the magnetizing position of the magnet assembly 72 obtained when the impact portion 49 of the sleeve 46 comes in contact with the impacted section 62 at the end of the holder 45 and the holder 45 is in the motor end position is known. Hence, it is possible to supply reverse current to the first coil 7a and the second coil 7b to select an energizing pattern, whereby the holder 45 actually begins to move toward the valve seat 69 to match the magnetizing position of the magnet assembly 72. Using this energizing pattern to actually start the movement of the holder 45 toward the valve seat 69 provides a proportional relationship between the number of steps and the actual amount of movement of the holder 45 from the first step, thereby permitting accurate control of the amount of air supplied to the internal-combustion engine.

Thus, the step motor in accordance with the present invention is equipped with: a motor case; a hollow columnar stator which is provided inside the motor case and which generates a magnetic field; a rotor which is rotatably provided in the stator and which rotates in steps according to the magnetic field generated by the stator; an actuating shaft which is fixed to the rotor and which has a threaded portion at one end thereof; a holder which is threadably engaged with the threaded portion and movable in the axial direction; and a guide which is fixed to the motor case which prevents the rotational motion of the holder and guides the holder to move in the axial direction. This configuration obviates the need for costly slide bearing which has a complicated structure, thus permitting lower manufacturing costs.

Further, the step motor in accordance with the present invention employs a support member in place of costly ball bearings contributing to lower manufacturing cost.

Moreover, in the step motor in accordance with the present invention, the bearing is urged by a spring toward the support member; hence, axial movement of the rotor can be prevented.

In the step motor in accordance with the present invention, the support member is discoid with a through hole through which a shaft passes and covers one side surface of the stator; hence, the entry of resin into the stator can be prevented when insert-molding.

Further, the step motor in accordance with the present invention is equipped with: a motor case; a hollow columnar stator which is provided inside the motor case and which generates a magnetic field; a rotor which is rotatably provided in the stator, which rotates in steps according to the magnetic field generated by the stator, which has a magnet assembly wherein south-pole and north-pole segments are disposed alternately and a positioning section for positioning the magnet assembly in a metal mold, and which has a sleeve made integral with the magnet assembly; an actuating shaft which is fixed to the rotor and which has a threaded portion formed on one end thereof; a holder which is threadably engaged with the threaded portion and which is movable in the axial direction; and a guide which is fixed to the motor case, which prevents the rotational motion of the holder, and which guides the holder to move in the axial direction; wherein the sleeve is formed with a fixed positional relationship established between the positioning section and the impact portion of the sleeve in the metal mold so that a fixed positional relationship is established between the initial position of the holder, when the end of the holder comes in contact with the impact portion to stop the rotation of the rotor, and the magnetizing position of the magnet assembly. This makes it possible to apply a predetermined energizing pattern to energize the stator at the initial position of the holder, thereby permitting accurate control of the amount the holder is moved.

Further, the step motor according to the present invention is made integral with the valve device which controls the flow of a fluid so as to control the flow of the fluid according to the reciprocating motion of the holder. This makes it possible to accurately control the movement of the holder, enabling accurate control of the flow of the fluid.

Moreover, in the step motor in accordance with the present invention, the valve for closing off the passages is integrally provided on an end of the holder, so that the structure of the step motor made integral with the valve device can be simplified.

What is claimed is:

1. A step motor comprising:

a motor case;

a hollow columnar stator which is provided inside said motor case and which generates a magnetic field;

a rotor which is rotatably provided in said stator and which rotates in steps according to the generated magnetic field of said stator;

an actuating shaft which is fixed to said rotor and which has a threaded portion at one end thereof;

a holder which is threadably engaged with said threaded portion and which is movable in the axial direction; and a cylindrical guide which is fixed to said motor case, which prevents the rotational motion of said holder and guides said holder to move in the axial direction.

2. A step motor according to claim 1, wherein said rotor is rotatably supported by a support member supporting a shaft protruding from one end of said rotor and a bearing provided on the other end of said rotor.

3. A step motor according to claim 2, wherein said bearing is urged by a spring toward said support member.

4. A step motor according to claim 2, wherein said support member is discoid with a through hole through which said shaft passes said support member preventing the entry of a resin into said stator when said support member is insert-molded together with said stator.

5. A step motor comprising:

a motor case;

a hollow columnar stator which is provided inside said motor case and which generates a magnetic field;

a rotor which is rotatably provided in said stator, which rotates in steps according to the generated magnetic field of said stator, which has a magnet assembly wherein south-pole and north-pole segments are disposed alternately and a positioning section is formed to place the magnetic assembly in a predetermined position in a metal mold, and which has a sleeve made integral with the magnet assembly;

an actuating shaft which is fixed to said rotor and which has a threaded portion formed on one end thereof;

a holder which is threadably engaged with said threaded portion and which is movable in the axial direction; and a guide which is fixed to said motor case, which prevents the rotational motion of said holder, and which guides said holder to move in the axial direction;

wherein said sleeve is formed with a fixed positional relationship established between said positioning section and an impact portion of said sleeve in said metal mold so that the fixed positional relationship is established between the initial position of said holder, when the end of said holder comes in contact with said impact portion to stop the rotation of said rotor, and the magnetizing position of said magnet assembly.

6. A step motor according to claim 5, wherein said step motor is made integral with a valve device which controls the flow of a fluid according to the reciprocating motion of said holder.

7. A step motor according to claim 6, wherein a valve for closing off passages is provided integrally on an end of said holder.

8. A step motor comprising:

a motor case;

a hollow columnar stator disposed inside said motor case, said stator capable of generating a magnetic field;

a rotor disposed rotatably in said stator and rotating according to the magnetic field generated by said stator;

an actuating shaft which is fixed to said rotor and having a threaded portion at one end thereof;

a holder threadably engaged with said threaded portion such that said holder is movable in an axial direction; and cylindrical guide means for preventing rotational motion of said holder and for guiding said holder to move in the axial direction, wherein said cylindrical guide means is fixed to said motor case.

9. The step motor according to claim 8 further comprising;

a support member disposed to rotatably support a shaft protruding from one end of said rotor; and a bearing disposed such that the other end of said rotor is rotatably supported.

10. The step motor according to claim 9 further comprising a spring member positioned such that said bearing is pressed toward said support member.

11. The step motor according to claim 9, wherein said support member is made of polyphenylene sulfide resin and which has a discoid through hole for support said shaft.

12. The step motor according to claim 9, wherein said holder is integrated with a valve device such that the flow of a material through said valve device is controlled according to reciprocating motion of said holder.

* * * * *